Figure 1:
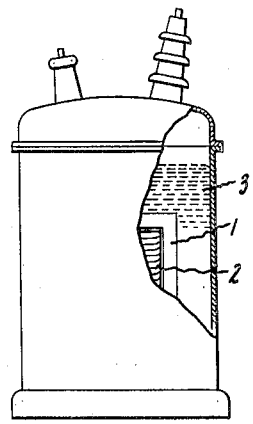

June 17, 1941.  R. W. WORK ET AL  2,246,159

ELECTRICAL COIL

Filed Dec. 1, 1938

Inventors:
Robert W. Work,
William H. Cooney,
by Harry E. Dunham
Their Attorney.

Patented June 17, 1941

2,246,159

UNITED STATES PATENT OFFICE 2,246,159

ELECTRICAL COIL

Robert W. Work and William H. Cooney, Pittsfield Mass., assignors to General Electric Company, a corporation of New York Application December 1, 1938, Serial No. 243,383

4 Claims. (Cl. 175—356)

Our invention relates to conductor coils constructed to form a part of electrical apparatus. More particularly the coils to which our invention relates are those which in use are submerged in an insulating liquid and are subject to more or less severe electro-magnetic forces. Common examples of such coils are those forming the windings of power transmission and distribution transformers.

Two of the chief requirements which must be satisfactorily met in present day electrical apparatus, for example transformers, to insure continuous service under severe operating conditions are that the insulating medium employed between the parts of the coil and between the coil and core shall have a high dielectric strength and that the parts of the coil shall be adequately secured against relative movement due to the electromagnetic forces which may be produced therein. In the past adequately high dielectric strength has been obtained by simply immersing the coil, wound in the usual manner, in a suitable insulating liquid, such as oil, after the coil has been given a drying and vacuum treatment. While such coils have shown very desirable insulation properties they have had the disadvantage of being unable adequately to resist relative movement of the turns due to the electromagnetic forces produced therein when heavy loads or short circuits occur with the result that continued movement has worn through the insulation. On the other hand coils which have their turns so thoroughly secured in place by impregnating the coil with a binder or filler that no movement can occur not infrequently have voids or pockets therein containing air or low pressure gas. Where such a condition exists an electric discharge or corona formation may be produced in the void which sooner or later results in a break-down in the coil.

One object of our invention is to provide an improved coil construction whereby the difficulties mentioned above may be overcome, that is, to provide a coil construction whose dielectric strength shall be of a very high degree and whose turns shall be so thoroughly fixed in position that no relative movement thereof can occur under any normal overload or short circuit condition.

Our invention will be better understood from the following description taken in connection with the accompanying drawing, and its scope will be pointed out in the appended claims.

In order that the relation of our invention to the prior art, particularly that exemplified by present common practice, may be fully appreciated, it seems desirable at this point to make the following observations. According to present manufacturing practices practically all transformer coils, as well as certain other coils, are now treated by one of three methods which are briefly:

A. Treating by means of a thermoplastic resin or so-called "compound" of which the ordinary materials used are "Vinsol," coal tar pitch, wood pitch or asphalt. The temperature of the material is raised to a point where its viscosity is reduced to such a degree that it may be forced into the open spaces of the coil by means of pressure.

B. Treating by means of a solution of a varnish after winding. The coils are dipped in the solution of varnish, drained, the solvent removed by heating and vacuum and the varnish cured by heating.

C. Treating by means of a varnish during the winding operation. As each layer of the coil is wound a solution of a varnish is applied to it. After the coil is completed the solvent is removed by means of heat and vacuum and the varnish cured.

In all of these methods, as well as in the method employed by us, there is a common objective which is to have a material that will bind or cement the conductors, conductor insulation, layer insulation, cotton tape and other parts of the coil into a coherent unit.

In our invention it is not necessary to raise the temperature of the coil to an extremely high point. Method A, for example, requires that the coil be raised to about 160° C. or higher before impregnation can take place in a reasonable length of time. This temperature has the effect of reducing the flexibility of the paper, cotton, wire enamel and other materials and the mechanical strength of the insulation. In addition, the compounds used in this manner are so brittle that movement or alterations of the leads, coil or insulation may result in breaking the insulation and impairing the dielectric strength.

According to our invention, the resin may be distributed throughout the coil during the process of winding whereas method B depends on the winding being loose enough to permit entry of the varnish. Since coils differ greatly in structure and therefore in ease of impregnation with a varnish, it has always been necessary to use a very large "factor of safety" to insure that the process is complete. This has resulted in a relatively great loss of time since the average coil required a much longer time in treatment than was necessary to impregnate it.

A further disadvantage of method B is that it is important to place the varnish in the exact location desired and in the amount that is desired. It is found that the varnish is always heavier on the outside of the coil than on the inside. In accordance with our invention it is possible to locate the resin in any amount and at any place in the coil that is desired.

A further disadvantage of method B is that solvents are used. These may soften the wire enamel and require both time and special equipment to remove them from the coil. Still another disadvantage of method B is that not only must great care be exercised to make positive that complete impregnation is obtained but even the simplest varnish treatment is a comparatively long operation, twenty-four or more hours being not unusual.

A disadvantage of method C is that the resin which is dissolved in a suitable solvent remains in contact with other resinous insulation such as wire enamel. This solvent has a tendency to soften and dissolve such insulation thereby rendering it electrically and physically weak. The coil in which a varnish in solution has been applied during winding requires the application of heat or vacuum in order to remove the solvents. Such treatment is costly and often is incomplete in that some solvent will be held tenaciously by the resin. A further disadvantage of method C is that the application of wet varnish to a coil is a difficult process in that the wet varnish tends to leak from the coil while other operations are being made upon it and gets on the workman's hands and the equipment which he uses. The solvents from such varnishes often have disagreeable odors and in many cases a bad physiological effect upon the workman which make them undesirable. In our invention we do not use any solvent and hence avoid the disadvantages of their use.

Our invention allows the manufacturing procedure to be greatly shortened, for example, the coils need not be accumulated as for varnish or compound treatment but may be placed on a moving conveyor system as fast as they are wound. The conveyor will carry them into an oven where they are heated by a counter blast of hot air. As the temperature rises most of the moisture is driven off first, then the resin on the layer insulation, described later in this application, softens allowing the insulated conductors to embed themselves in it and if it is heat curable it is then converted to the heat infusible state. When the coil comes out of the oven it may be placed in a vacuum tank where the last traces of moisture may be removed by drawing a vacuum for a short time. The coils are then ready for assembly in their own tanks and the tanks ready for filling with oil.

Figure 2:
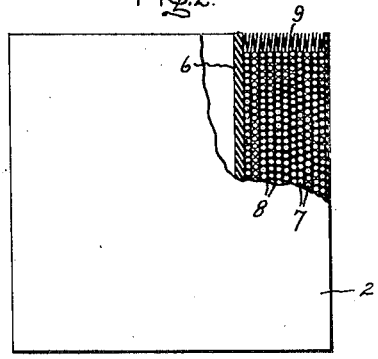
Figure 4:
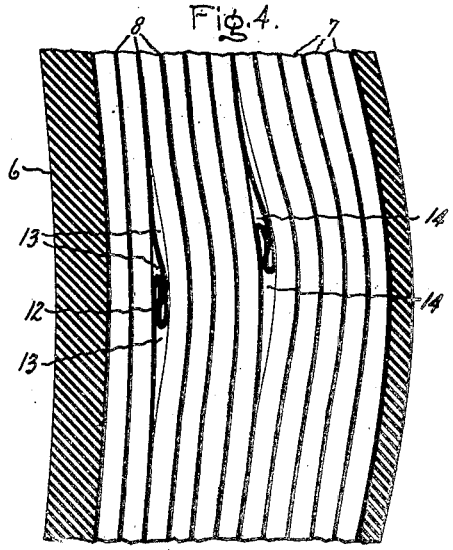
Figure 3:
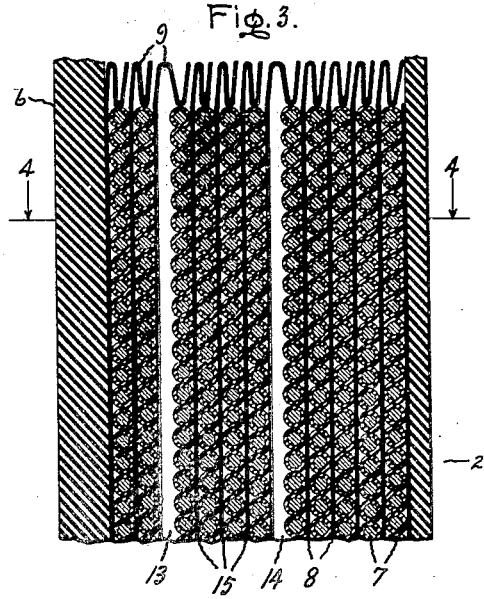
Figure 5:
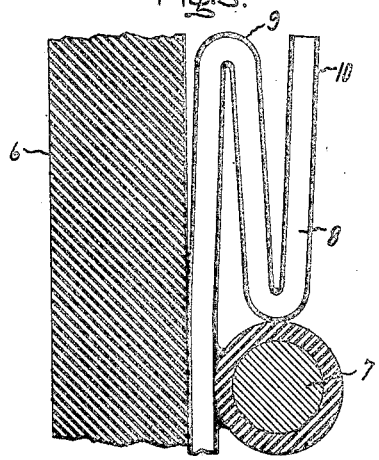

Referring to the drawing, Fig. 1 shows a transformer including a coil illustrating one embodiment of our invention; Fig. 2 is an enlarged view partly in section of the coil shown in Fig. 1; Fig. 3 shows a portion of Fig. 2 drawn to a still larger scale; Fig. 4 is a cross sectional view taken on the line 4—4 of Fig. 3; and Fig. 5 is a fragmentary view drawn to a still larger scale.

While the coil structure to which our invention relates is applicable to various forms of electrical apparatus we have chosen to illustrate it, by way of example, as forming a part of a step down transformer of the distribution type wherein the core 1 and the coil 2, which may be the primary winding, are immersed in an insulating liquid shown at 3 contained in the casing 4. The coil comprises the inner tubular insulating cylinder 6 upon which the insulated wire 7 is wound in a number of layers. Each successive layer of wire is wound on a layer of insulating sheet material 8 having its projecting edges folded back as shown at 9 for spacing purposes. If desired, strips of insulating material, such as thick fibre paper or pressboard, may be substituted for the folded edges 9. Where taps are desired they are made during the winding operation in the well understood manner by soldering thin conducting strips to the bared wire and bringing them out laterally of the coil in the usual manner.

Those familiar with this method of winding and insulating coils are no doubt well aware of the difficulty experienced when making such coils in preventing a wrinkling or puckering of portions of an insulating layer, as for example when paper is used, when the next layer of wire is wound thereon. It appears that after a few layers of wire and insulation have been applied slight variations in uniformity of the coil occasionally occur with the result that when the next insulating layer is put in place and the next layer of wire is wound on it under pressure the compressive force of the wire causes the insulating layer to wrinkle at one or more points. Wherever this happens small gaps occur between the two adjacent layers of the wire due to the added thickness of the insulating layer at the wrinkle. Where round wire or square wire with rounded corners is used small gaps of course are present between adjacent turns and the insulating layers. Unless all such gaps are subsequently filled with insulation they constitute sources of danger since it is well known that where voids occur in a coil, break down of the coil may ultimately be produced if the potential difference across the void is sufficient to cause a discharge therein. The probability of the presence of voids in the coil is further increased where the coil is provided with taps extending to some inner portion thereof.

In accordance with our invention, we employ for the insulation between the layers of turns insulating sheets which are composed of material capable of absorbing and transmitting therethrough the insulating liquid 3 by capillary action and which have their faces covered with a thin layer 10 of material which makes a firm bond between the insulated wire and the sheet material. The bonding material does not impregnate or penetrate the sheet material to any appreciable extent but rather remains on the surface thereof although it firmly adheres thereto as well as to the insulated wire which becomes embedded therein during the heat treatment.

For the sheet insulating material, which may comprise a single thickness or a plurality of laminae, we preferably employ a strong, tough paper such as that known to the trade as "water-finished kraft" paper having a thickness of about 0.005 of an inch. A satisfactory and inexpensive binding material is shellac although various other binding materials may be used. A thin layer only of the binding material is applied to the sheet insulation. If a single sheet only is used between two adjacent layers of wire it will be coated on both sides; if more are used one will be coated on both sides and the others on one side only. The material, however, should not impregnate the insulation or penetrate it to any appreciable extent but merely adhere to the surface. When paper and shellac are used a shellac coating of only approximately 0.0005 of an inch is applied to the faces of the paper, the coated paper being then heated only enough to remove the solvent whereby the shellac remains on the surface of the paper in a dry flexible condition facilitating the handling of the paper. After the coil is completely wound with the interleaved layers of shellac coated paper the entire coil is heated to the proper temperature to soften and complete the curing of the shellac. During the softening the insulated wire embeds itself in the shellac and when the latter is cured the turns remain firmly bonded to the paper at each side thereof.

An important feature of our invention is that while the bonding material firmly secures the turns to the sheet insulation it does not impregnate the latter or penetrate it to any appreciable extent but rather remains on the surface thereof, it being remembered that the layer of shellac is extremely thin. This has a very desirable result. The sheet insulation being unimpaired by the bonding material in its ability to transmit the insulating liquid into which the coil is immersed forms channels between the adjacent layers of wire through which the insulating liquid is supplied to all spaces and voids in the interior of the coil between adjacent turns of the same layer and between turns of adjacent layers. The air and gas which originally fills such spaces and voids are removed by subjecting the coil to a vacuum followed by the admission of insulating liquid, such as that in which the coil is to be permanently immersed. Because of the extreme thinness of the bonding material the insulating liquid after penetrating the paper by capillary action readily passes through it.

Figs. 3 and 4 which show a portion of the coil drawn to a still larger scale are provided for the purpose of making it more apparent why voids occur within the coil. In constructing the coil by alternately winding on a layer of wire and covering it with a layer of sheet insulation until the desired number of layers of wire have been applied the presumption would be that each layer of insulation would engage all portions of the wire layer upon which it is wrapped and present a smooth appearance. In actual practice, however, this unfortunately is not true. Instead it is found that after a few layers of wire and insulation have been laid on, a wrinkling or puckering of the insulation often occurs at one place or another as has already been mentioned in a previous part of this description. An enlarged cross sectional view of such a coil taken on a plane at right angles to the coil axis may appear as shown by Fig. 4. Possibly because of some irregularity during winding the sheet insulation 8 between the second and third layers of wire became wrinkled as the next layer of wire was wound on as shown at 12. Because of the wrinkle these two layers of wire are separated by the narrow gaps or voids 13 which are not filled by the sheet insulation. The same condition at another part of the coil is represented between the wire layers 6 and 7 where the gaps or voids 14 are shown. It will be understood that by reason of the stiffness of the sheet insulation it will not completely flatten down under the winding tension of the next layer of wire. If the coil is provided with one or more taps leading into the interior thereof the two layers between which a tap runs will be separated at each side of the tap a distance at least equal to the thickness of the tap thus producing additional gaps or voids.

In Fig. 3 the gaps or voids 13 appear as a slight spacing of the second and third wire layers from each other and likewise the voids 14 appear as a slight spacing of the sixth and seventh layers from each other, which spacing may extend only part way across the coil, it being understood that the structure is shown greatly enlarged in Figs. 3 and 4. In addition to the above mentioned gaps or voids there are the numerous inevitable, small three cornered gaps 15 around the wire comprising the winding when round wire or rectangular wire having rounded corners is used since the turns of such wire will not completely fill the space between two adjacent layers of the sheet insulation. As has already been pointed out above, if electric discharges are allowed to take place in such voids a break down in the coil is likely to occur.

By employing an insulation sheet which becomes saturated with a liquid insulation, such as oil, having a dielectric strength many times that of air and which also conducts the liquid insulation surrounding the coil into the interior thereof to supply the liquid to any and all gaps or voids that occur or may be left therein during winding we have constructed a coil in which there are no voids or gaps which are not filled with the same insulating liquid and a coil having the highest dielectric strength between points where a material difference of potential exists. At the same time the coil which we have constructed has its turns firmly bonded to the sheet insulation to enable them to withstand without relative movement the electromagnetic forces which may be produced as a result of overloads and short circuits.

What we claim as new and desire to secure by Letters Patent of the United States is:

1. A transformer having a winding submerged in an insulating liquid, said winding comprising a plurality of superposed layers of insulated wire and a layer of paper between adjacent layers of wire, said paper having thereon a thin coating of adhesive material capable of passing said liquid therethrough and forming a bond between the paper and the wire, the body of the paper being substantially free of said adhesive material and serving to transmit said insulating liquid to the interior portions of the coil.

2. An electrical coil submerged in an insulating liquid, comprising a plurality of layers each comprising a plurality of turns of wire and sheet insulation capable of transmitting said liquid and arranged between each two adjacent layers of wire having on opposite sides thereof thin coatings of adhesive material capable of passing said liquid therethrough and forming a bond between the wire and the insulation, said adhesive material being limited to the surface of said insulation whereby the latter serves to transmit the said liquid to the interior portions of the coil.

3. An electrical coil submerged in an insulating liquid comprising a plurality of superposed layers of insulated wire and layers of paper between said layers of wire, the paper comprising said layers serving to transmit said liquid from the ends of the coil to the interior thereof, said paper layers having on each side thereof a thin surface coating of adhesive capable of passing said liquid therethrough and firmly binding the wire to the paper, the interior portion of said paper being free from said adhesive whereby it is able to transmit said liquid.

4. An electrical coil submerged in insulating oil comprising a plurality of layers each including a plurality of turns of wire and a layer of paper between each two adjacent layers of wire, said paper having thereon a coating of shellac on opposite faces thereof forming a bond between the paper and the wire, said coating being confined to the surfaces of the paper whereby the body of the paper serves to transmit the oil into the interior portions of the coil and being so thin that the transmitted oil readily passes through said coating.

ROBERT W. WORK.
WILLIAM H. COONEY.